Patented Apr. 2, 1946

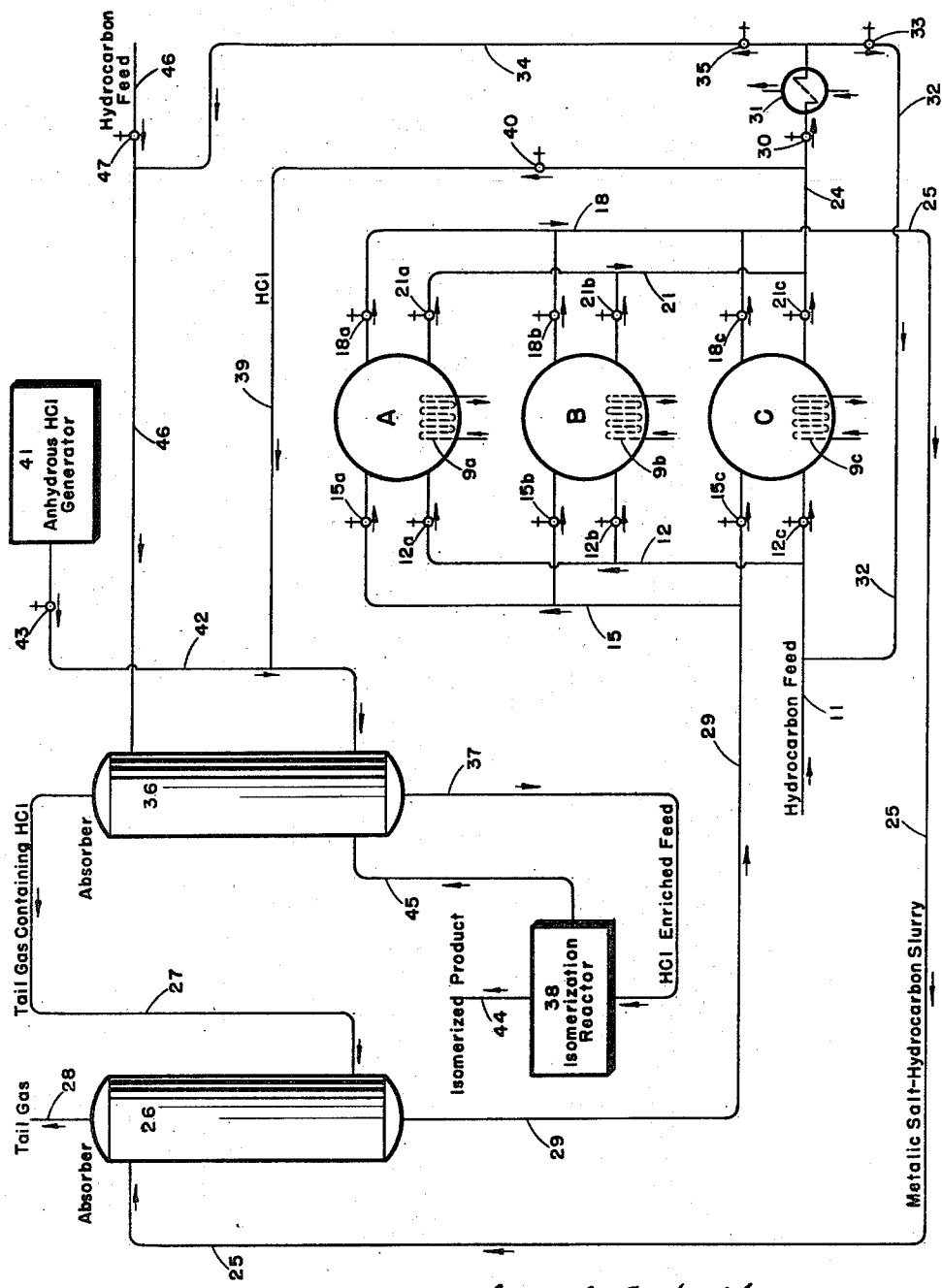

2,397,769

UNITED STATES PATENT OFFICE 2,397,769

RECOVERY OF HYDROGEN HALIDE

Edward Frank Wadley, Baytown, Tex., assignor to Standard Oil Development Company, a corporation of Delaware Application May 29, 1944, Serial No. 537,861

10 Claims. (Cl. 23—154)

The present invention relates to a method for recovering hydrogen halides from gases. More particularly it is concerned with a method for recovering hydrogen chloride from the light hydrocarbon and other fixed gases evolved from isomerization and other conversion operations using hydrogen chloride as a promoter for the reaction.

A number of conversion operations employ large quantities of hydrogen halide gases as the promoter required to activate the catalyst employed in the process. An example of the type of operation which employs large quantities of hydrogen halide promoter is the isomerization process for paraffin hydrocarbons described by d'Ouville and Evering in U. S. Patent No. 2,266,012. In this process it is necessary to provide a high percentage of hydrogen halide in the reaction. In commercial installations this process has the disadvantage of a high consumption of hydrogen chloride or other hydrogen halide required to promote the reaction. The major portion of the hydrogen halide charged to the reaction system becomes admixed with a large amount of gases, such as methane and ethane, boiling in the same range as hydrogen chloride and formed during the reaction. This gaseous mixture is discharged from the reaction system, and, since it is economically impractical to recover the hydrogen chloride from these gases by distillation, it has been the practice, in commercial installations, to scrub the residue gases with alkaline solution to destroy the halide. The loss of the hydrogen halide has formed one of the major expenses in the operation of conducting the conversion operation.

It is, therefore, the main object of the present invention to provide a process whereby a hydrogen halide is recovered from gases containing it in a continuous process whereby the reagent is continuously contacted with the hydrogen halide-containing gas in one stage and the hydrogen halide recovered from the reagent under desorption conditions in another stage with the reagent being recycled for re-use.

In the practice of the present invention a gaseous mixture containing hydrogen halide is contacted with a slurry comprising a low-boiling anhydrous liquid vehicle and an anhydrous metal salt having a high absorption capacity for the hydrogen halide. The hydrogen halide is taken up by the metal salt and the slurry is then passed to a desorption step in which the low-boiling liquid vehicle is distilled from the salt and the temperature then increased to remove the hydrogen halide and restore the anhydrous metal salt to its original condition. The anhydrous metal salt is then contacted with anhydrous liquid to form a slurry and the cycle is repeated by using the slurry to contact a gaseous mixture containing hydrogen halide.

The anhydrous liquid used as the vehicle for the slurry is preferably a paraffinic hydrocarbon having from four to six carbon atoms in the molecule. If the conversion process employs a feed of this character, a satisfactory method for conducting the cycle of operation involves the use of the feed or a portion of the feed for making up the slurry and after the desorption step the hydrocarbons removed by distillation may be admixed with hydrogen chloride and passed to the conversion unit.

For commercial operations it is generally satisfactory to employ copper sulfate as the anhydrous metal salt having a high absorption capacity for the hydrogen halide. When copper sulfate is used to form the slurry the amount suspended in the anhydrous liquid may vary within rather large limits, but it is preferable to use about 25% by weight of anhydrous copper sulfate based on the liquid vehicle. If the anhydrous copper sulfate is present in the slurry in amounts greater than 50% by weight, the solution can be pumped only with difficulty, while if amounts less than 25% by weight are used, the degree of absorption is lower. In general, the slurry may contain between about 15% to 35% by weight of copper sulfate.

It has been stated that other types of metallic salts may be used in forming a slurry for the removal of hydrogen halide from gases containing it. An example of another salt found useful in the practice of the present invention is cuprous chloride. The properties which a salt must have in order to be useful in the present invention are that it be capable of being formed in its anhydrous state into a slurry with oil and of combining with substantial quantities of hydrogen halide, as by forming an addition compound therewith.

The present process may be said to be carried out in two stages, an absorption stage and a desorption stage. The first stage includes the step of forming a slurry of an anhydrous metal salt in an anhydrous liquid and contacting the slurry with a hydrogen halide-containing mixture to absorb hydrogen halide from the mixture. The desorption stage includes the steps of subjecting the slurry first to conditions to distill off the anhydrous liquid and subsequently to decompose the complex into hydrogen halide gas and the anhydrous metal salt. The recovered metal salt is again mixed with anhydrous liquid to form a slurry and the cycle repeated.

As stated before, it is advantageous to employ a $C_4$ to $C_6$ hydrocarbon to be subjected to conversion conditions as the anhydrous liquid in making up the slurry, and in the desorption step the hydrocarbon separated from the metallic salt may be fed directly to the conversion step as may the hydrogen halide subsequently removed from the salt. When the feed for the conversion step is used for making up the slurry, fresh hydrocarbon liquid is available for use as the anhydrous liquid vehicle every time the recovered metallic salt is reslurried.

In the step of absorbing the hydrogen halide by the slurry the temperature should be in the range from about 60° F. up to 100° F. at atmospheric pressure. It is to be understood, of course, that while atmospheric pressure is satisfactory in the absorption stage, the absorption may be conducted at higher pressures up to about 350 pounds per square inch or even higher. Likewise, while a temperature of 100° F. has been mentioned as a convenient upper limit, it may be desirable to exceed this and go up to about 125° F.

In the desorption stage the step of distilling off the low-boiling anhydrous liquid may be accomplished at atmospheric pressure without danger of appreciable decomposition of the metallic salt-hydrogen halide complex if $C_4$ to $C_6$ hydrocarbons have been used as the anhydrous liquid. After the anhydrous liquid has been distilled off from the complex, it is preferred to increase the temperatures in the desorption stage to those ranging between 325° F. and 380° F. The actual upper limit is that dictated by the dissociation temperatures of the components of the mixture and the melting point of the copper sulfate or equivalent salt. It is understood, of course, when salts other than anhydrous copper sulfate are used, the conditions of absorption and desorption will vary.

The invention will be better understood by reference to the drawing, in which the single figure is a flow diagram of a preferred embodiment thereof.

Referring now to the drawing, three vessels, A, B and C, are provided with inlet manifold 12 having valves 12a, 12b and 12c, inlet manifold 15 having valves 15a, 15b and 15c, outlet manifold 18 having valves 18a, 18b and 18c, and outlet manifold 21 having valves 21a, 21b and 21c. The vessels are provided with heating means, such as heating coils 9a, 9b and 9c, respectively. The vessels A, B and C may, for convenience, be termed desorbers, although each in turn during the cycle of operation serves both as a container for anhydrous metal salt being slurried, as a storage means, and as a distillation and desorber vessel. In describing the operation being carried out in the apparatus, it will be assumed that at the start of the operation vessel A contains anhydrous metal salt suitable for being formed into a slurry, that vessel B is filled with slurry being desorbed, and that vessel C is serving as a storage vessel for slurry which is to be desorbed. The vessels are utilized for this purpose by closing valves 15a, 12b, 15b and 12c and opening valves 12a and 15c in the inlet manifolds, and opening of valve 18a and valve 21b and closing of valves 18b, 21a, 18c and 21c in the outlet manifolds.

A low-boiling anhydrous liquid such as a $C_6$ hydrocarbon is passed through line 11 to manifold 12 and valve 12a into vessel A. In vessel A the anhydrous liquid forms a suspension with the anhydrous metal salt and the suspension is removed through manifold 18 and valve 18a, and passes through line 25 to an upper portion of absorption tower 26, and is discharged therein. A mixture of gases containing a hydrogen halide, such as hydrogen chloride, is discharged into a lower portion of absorption tower 26 by means of line 27 and flows upwardly in the tower countercurrent to the slurry. For purposes of illustration, it may be assumed that the hydrogen chloride-containing gas entering the absorption tower through line 27 comprises hydrogen, methane, ethane and 10% or less of heavier hydrocarbons such as propane, butane and pentane. The upper end of tower 26 is provided with line 28 for the discharge of hydrogen chloride-free gas, and the bottom thereof is provided with line 29 for withdrawing slurry containing absorbed hydrogen chloride.

Absorption tower 26 is preferably a packed tower so designed as to effect intimate contact between the upflowing gaseous material and the downflowing slurry, and to maintain the copper sulfate in suspension in the slurry throughout the time it contacts the upflowing gases. It will be understood that when temperature and pressure conditions are maintained in the tower such that substantially all the hydrogen, methane and ethane pass through the tower and are discharged through line 28, some of the propane and the heavier hydrocarbon gases will dissolve in the slurry along with the hydrogen chloride. Build-up of propane and heavy hydrocarbons in the system may be avoided by discarding a bleed stream, by means not shown, whenever this becomes necessary.

The hydrogen chloride-rich slurry is discharged from tower 26 through line 29 and by means of manifold 15 and valve 15c into vessel C, which is used as a storage space preliminarily to the heating of the slurry in the actual desorption step.

Vessel B has previously received hydrogen chloride-rich slurry and is serving as the desorber in this stage of the process. The heating step is conducted in vessel B in two stages, with the heating medium passing through heating coil 9b. In the first stage the slurry is heated to a temperature sufficiently great to vaporize the low-boiling vehicle, but without appreciably decomposing the copper sulfate-hydrogen chloride complex. The low-boiling hydrocarbon is removed from vessel B through manifold 21 and valve 21b, and passes through line 24, valve 30 and cooler 31 to cause condensation of the liquid. After the liquid is condensed in cooler 31 it may be passed either into line 32, controlled by valve 33, or line 34, controlled by valve 35. If it is desired to recycle the anhydrous liquid and use it for making up additional slurry, valve 33 is opened and the material is passed through line 32 back into line 11. It is usually more advantageous, however, to use fresh anhydrous liquid for making up slurry and to pass the liquid from cooler 31 into a conversion unit. When the latter course is desired, valve 33 is closed and valve 35 opened and the liquid passed through line 34 into the upper portion of an absorption vessel 36. In this vessel the hydrocarbon is commingled with hydrogen chloride as a promoter and is removed from the bottom of this vessel through line 37 and passed to the conversion unit, such as isomerization unit 38.

After the liquid vehicle has been removed by distillation in vessel B the temperature within the vessel is increased to decompose the hydrogen chloride-copper sulfate complex and vaporize the hydrogen chloride. The hydrogen chloride passes from vessel B through manifold 21, valve 21b, into line 39, controlled by valve 40, and into the lower portion of absorption vessel 36. In this vessel the hydrogen chloride is commingled with hydrocarbon feed as above described and the enriched feed withdrawn from the bottom of the vessel by means of line 37.

It will be understood that the three vessels A, B and C are used in rotation in the process. After the liquid vehicle and hydrogen chloride have been removed from vessel B, the metal salt remaining in the vessel is suitable for admixture with the anhydrous liquid vehicle to form the slurry. The metal salt in vessel A at the beginning of the described cycle was being consumed in the making up of the slurry, and slurry enriched with hydrogen chloride was being accumulated in vessel C while vessel B was being used as a desorber. Accordingly, after the slurry in vessel B has been treated to remove the liquid vehicle and the hydrogen chloride therefrom, the setting of the valves is changed in the manifolds so that the anhydrous hydrocarbon flows through line 11, manifold 15, valve 15b and into vessel B to take up anhydrous metal salt, and leaves vessel B through manifold 18, valve 18b and passes through line 25 into absorption vessel 26. Valve 12a is opened to divert enriched hydrogen chloride-containing slurry in vessel A. The inlet valves 12c and 15c controlling flow into vessel C are closed and heat is supplied heating coil 9c to allow the use of vessel C as a desorber, with the vapors from vessel C being removed through manifold 21 and valve 21c.

It will be understood that inevitably small amounts of hydrogen halide will be lost from the the system, and make-up hydrogen halide may conveniently be supplied by means of generator 41, fluidly connected to line 39 by means of conduit 42, containing valve 43.

From isomerization unit 38 the isomerized product may be withdrawn by line 44 for further processing, for example to fractionating towers. Gases from the isomerization reaction, including hyrocarbon gases and hydrogen halide, are withdrawn from isomerization vessel 38 via line 45 and pass into a lower portion of absorption vessel 36, where they are contacted with hydrocarbon feed used as an absorption agent. The tail gases containing unabsorbed hydrogen halide are withdrawn from the top of absorption vessel 36 by line 27 and are passed into absorption vessel 26, where they are contacted with the slurry of anhydrous metallic salt in a manner previously described.

The operation wherein the hydrocarbon feed subsequently subjected to isomerization conditions in unit 38 is employed for making up the slurry used in tower 26 is usually the most satisfactory method of operation. However, under some conditions it may be desirable to recycle a part or all of the anhydrous liquid employed as the vehicle in the slurruy and to inject separately a part or all of the hydrocarbon feed to be subjected to the conversion conditions. The hydrocarbon feed may be separately injected through line 46 containing valve 47, which enables the feed to be discharged into absorption vessel 26, with the enriched feed withdrawn from the vessel and passed through line 37 into the isomerization unit. When using this embodiment the anhydrous liquid used as a vehicle for the slurry is recycled by way of line 32 and used a number of times for making up slurry in vessels A, B and C.

It may at times be desirable to provide mixing means in vessels A, B and C in order to obtain more rapid mixing, and will result by the mere flowing of the anhydrous liquid vehicle through the anhydrous metal salt. The use of mixing means for aiding in the formation of a slurry is well known to the art, and for that reason is not illustrated in detail. It will also be understood that while three vessels, A, B and C, which serve as slurrying vessels and desorbing vessels in the process have been illustrated in the drawing, a greater or lesser number of such vessels may be employed. By the use of suitable storage facilities, two or even one vessel may be used for conducting the slurrying and desorbing operation, while, on the other hand, a larger number than three vessels may at times be desirable.

In my copending application Serial No. 489,995, filed June 7, 1943, I have described a process for recovering hydrogen halides from a gaseous mixture with a slurry of metallic salt, with the metallic salt maintained in a slurry in both the absorption step and the desorption step. A slurry of metallic salt in an anhydrous liquid vehicle is more effective for absorbing hydrogen halide than is the dry salt, and the present application retains this advantageous procedure disclosed in the previously filed application. It is, however, more advantageous to desorb a dry salt than to desorb a slurry, and the procedure of the present invention combines the advantageous absorption of hydrogen halide in a slurry with the advantageous desorption of the hydrogen halide from a dry salt. It has also been found under many operating conditions that the slurry employed for absorbing the hydrogen halide has a tendency to form polymers, and the procedure of the present application allows the polymers to be separated from the metal salt during each cycle of the operation. It will be apparent that if the temperatures employed for decomposing the complex are not sufficiently great to remove all of the tarry organic materials from the metallic salt, the temperature may be increased within the desorption vessel or the pressures reduced, or both, in order to remove these polymers by vaporization and obtain a purified metallic salt for reslurrying.

Having fully described and illustrated the nature and objects of the present invention, what I wish to claim is:

1. A process for recovering hydrogen halides from their mixtures with other gases which comprises contacting the hydrogen halide-containing gas with a slurry of an anhydrous metal salt having a high absorption capacity for the hydrogen halide in a low-boiling anhydrous liquid of organic nature inert to hydrogen halide, subsequently subjecting the slurry containing absorbed hydrogen halide to conditions to distill off the anhydrous liquid and then decomposing the residue into hydrogen halide and anhydrous metal salt.

2. A process in accordance with claim 1 in which the hydrogen halide is hydrogen chloride.

3. A process in accordance with claim 1 in which the anhydrous liquid is a hydrocarbon.

4. A process for recovering hydrogen chloride from gases containing it which comprises the steps of contacting hydrogen chloride-containing gas with a slurry of anhydrous copper sulfate and a liquefied $C_4$ to $C_6$ hydrocarbon inert to hydrogen halide for a time sufficient for substantially complete reaction of the hydrogen chloride with the copper sulfate contained in the slurry, withdrawing the slurry containing hydrogen chloride as a copper complex, subjecting the slurry to conditions to cause distillation of the hydrocarbon without substantial decomposition of the complex, subsequently subjecting the complex to conditions to dissociate it into hydrogen chloride and metallic salt, recovering the hydrogen halide, admixing fresh hydrocarbon with the metal salt to form additional slurry and employing it to contact additional hydrogen chloride containing gases.

5. A process in accordance with claim 4 in which the hydrocarbon is a $C_6$ hydrocarbon.

6. A process in accordance with claim 4 in which the absorption is conducted at a temperature not greater than 125° F. and at pressures up to 400 pounds per square inch and the hydrocarbon is removed from the slurry at temperatures of approximately 212° F. and the dissociation is conducted at temperatures between 325° F. and 380° F. and at pressures below the pressure of the gas charged to the absorption stage.

7. A process for recovering hydrogen halides from their mixtures with other gases which comprises contacting the hydrogen halide-containing gas with a slurry of an anhydrous metal salt selected from the class of compounds represented by cuprous chloride and cuprous sulfate in a liquefied $C_4$ to $C_6$ hydrocarbon inert to hydrogen halide, subjecting the slurry containing absorbed hydrogen halide to conditions to cause first the removal of the hydrocarbon by distillation and subsequently the evolution of hydrogen halide from the metal salt.

8. In a process wherein a low-boiling hydrocarbon feed inert to hydrogen halide is subjected to a chemical reaction in the presence of a hydrogen halide promoter, the steps of admixing at least a portion of the liquefied hydrocarbon feed with an anhydrous metal salt having a high absorption capacity for hydrogen halide to form a slurry, removing a gaseous mixture including hydrogen halide from the chemical reaction, contacting the gaseous mixture with the slurry under conditions to cause the absorption of hydrogen halide by the slurry, withdrawing the slurry from contact with the gases and subjecting it to conditions to distill the hydrocarbon therefrom, and subsequently subjecting the residue of the slurry to conditions to cause the evolution of hydrogen halide, and passing the hydrocarbon and the hydrogen halide recovered from the slurry to the chemical conversion step.

9. A process in accordance with claim 8 in which fresh $C_4$ to $C_6$ hydrocarbon feed is admixed with the metal salt from which the hydrocarbon and the hydrogen halide have been removed to form additional slurry and the additional slurry is employed to contact additional hydrogen halide-containing gases.

10. A method in accordance with claim 8 in which a $C_6$ hydrocarbon is the feed employed for making the slurry and in which the metal salt from which the hydrocarbon and hydrogen halide are removed is contacted with additional hydrocarbon feed to make up additional slurry and the additional slurry is contacted with hydrogen halide-containing gases.

EDWARD FRANK WADLEY.